United States Patent [19]

Tanaka et al.

[11] Patent Number: 4,501,576
[45] Date of Patent: Feb. 26, 1985

[54] POWER TRANSMISSION MECHANISM

[75] Inventors: Mitsuo Tanaka, Kuki; Kunitoshi Kozakae, Ageo, both of Japan

[73] Assignee: Bridgestone Cycle Co., Ltd., Tokyo, Japan

[21] Appl. No.: 438,499

[22] Filed: Nov. 2, 1982

[30] Foreign Application Priority Data

Nov. 12, 1981 [JP] Japan ................................ 56-180320
Nov. 19, 1981 [JP] Japan ................................ 56-184372
Nov. 19, 1981 [JP] Japan ................................ 56-184373

[51] Int. Cl.³ .............................................. F16H 7/08
[52] U.S. Cl. .................................... 474/141; 474/151; 474/148; 474/112; 74/438
[58] Field of Search ................. 74/390, 438, 805, 804, 74/467, 468; 474/141, 148, 151, 91, 176, 179; 418/142; 184/6.12

[56] References Cited

U.S. PATENT DOCUMENTS

| 2,874,594 | 2/1959 | Sundt | 74/467 |
| 3,190,149 | 6/1965 | Gorfin | 474/141 |
| 3,990,539 | 11/1976 | Marit | 74/467 |
| 4,321,750 | 3/1982 | Sugihara | 474/91 |
| 4,374,480 | 2/1983 | Diaz | 74/467 |

FOREIGN PATENT DOCUMENTS 115719 12/1899 Fed. Rep. of Germany .
3100922 12/1980 Fed. Rep. of Germany .

Primary Examiner—Stephen J. Novosad
Assistant Examiner—Mark J. DelSignore
Attorney, Agent, or Firm—Parkhurst & Oliff

[57] ABSTRACT

A power transmission mechanism includes a gear member and an annular and eccentric floating member having internal gear teeth meshed with external gear teeth of the gear member. A pair of guide plates provided on both outer sides of either the gear member or floating member prevent lateral disengagement of the floating member from the gear member. A pair of seal rings arranged between the inner sides of the guide plates and the outer sides of either the floating member or gear member prevent entry of dust or the like foreign material into a substantially closed space between the teeth of the gear member and the floating member, to thereby improve the durability of the mechanism.

4 Claims, 10 Drawing Figures

FIG. 6
FIG. 7
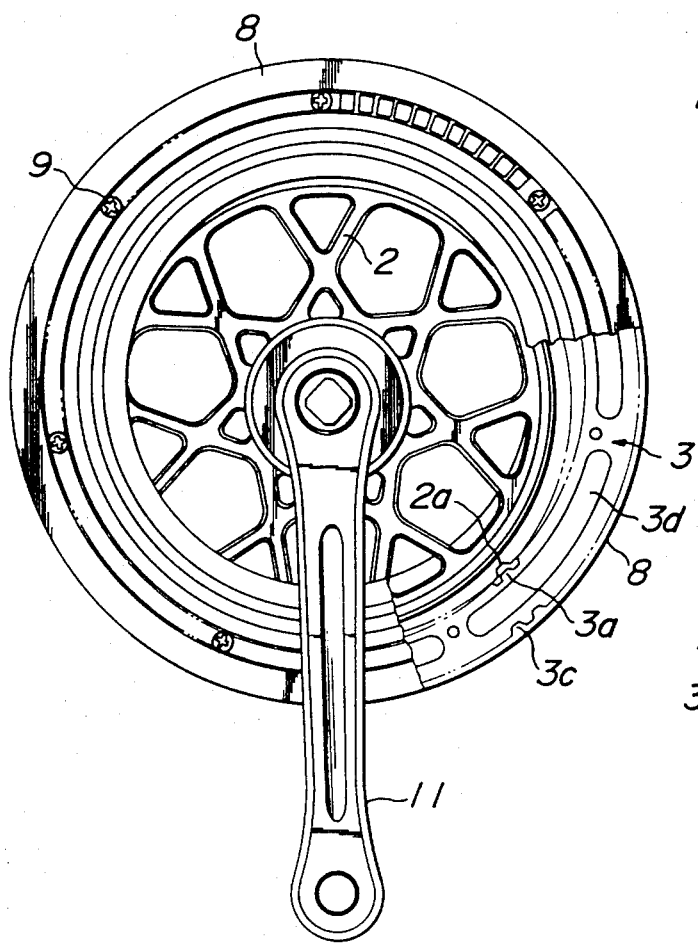
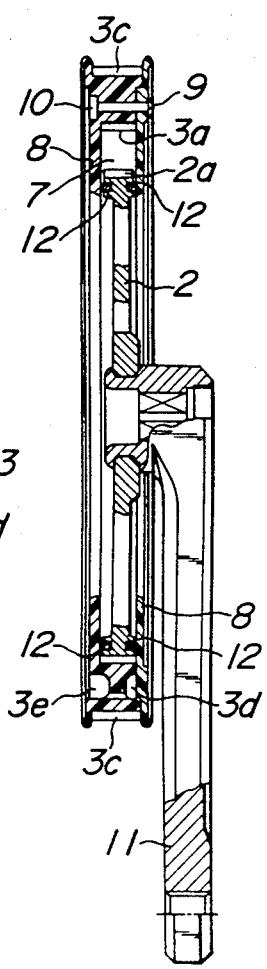

POWER TRANSMISSION MECHANISM

BACKGROUND OF THE INVENTION

1. Field of the Invention

The present invention relates to a power transmission mechanism comprising a gear member formed with external gear teeth, an annular floating member formed with internal gear teeth meshed with the external gear teeth of the gear member, and arranged in an eccentric relation to the gear member, a transmission wheel member spaced from the floating member and the gear member, and an endless and flexible transmission member engaging the outer peripheries of the floating member and the transmission wheel member.

2. Description of the Prior Art

German Pat. No. 115,719 discloses a power transmission mechanism of the type mentioned above. With such a mechanism, the difference in tension of the endless transmission member between the tight side and slack side can be effectively compensated for. The term "endless transmission member" as used herein includes a cog-belt made of reinforced elastomeric material, and a chain. When the mechanism is used in a condition in which it is subjected to vibration, e.g. in a bicycle or the like, the floating member tends to laterally disengage from the gear member to such an extent that an efficient power transmission cannot be effected or, as the case may be, there takes place serious damage to the mechanism or to the frame of the bicycle or the like.

The occurrence of the lateral disengagement can be eliminated by providing the mechanism with a pair of guide plates for limiting the relative displacement between the gear member and the floating member. As described in German Offenlegungsschrift DE 31 00 922 A1 published after the priority date of the present application, those guide plates may be secured either to the gear member or to the floating member. On the other hand, provision of the guide plates encounters another problem that dust or foreign material tends to enter into the closed space between the internal teeth of the floating member and the external teeth of the gear member, through narrow gaps between the guide plates and the floating member and/or between the guide plates and the gear member. The gaps are more or less formed even when the guide plates are positively secured by bolts and nuts to the floating member or to the gear member, with their opposite inner sides in sliding contact with the outer sides of the gear member or the floating member, because of possible deformation or deflection of the guide plates accompanying an increase in sliding resistance between the guide plates and the gear member or floating member.

SUMMARY OF THE INVENTION

Accordingly, it is an object of the present invention to provide a power transmission mechanism of the type mentioned above, which is capable of effectively preventing the lateral disengagement of the floating member from the gear member without permitting entry of dust or foreign material into the space between the teeth of the floating member and the gear member.

In order to achieve the object, the present invention provides a power transmission mechanism of the type mentioned above, which is characterized in that one of the floating member and the gear member is provided on both outer sides thereof with a pair of annular guide plates for preventing disengagement of the floating member laterally from the gear member, the guide plates each having an iner diameter which is smaller than the root circle diameter of the gear member, and that a pair of seal rings are arranged between the opposite inner sides of the guide plates and both outer sides of the other of the floating member and the gear member.

With this arrangement, the guide plates effectively prevent disengagement of the floating member laterally from the gear member, and cooperate with the seal rings to prohibit entry of dust and other foreign material into the closed space between the teeth of the floating member and the gear member, through the gaps between the guide plates and the floating member and/or gear member.

BRIEF DESCRIPTION OF THE DRAWINGS

FIG. 6 is a partly broken front view of the floating member and gear member according to a preferred embodiment of the present invention which is applied to the power transmission mechanism of a bicycle;

FIG. 7 is a sectional view of the assembly shown in FIG. 6; and

DETAILED EXPLANATION OF PREFERRED EMBODIMENTS

Figure 1:
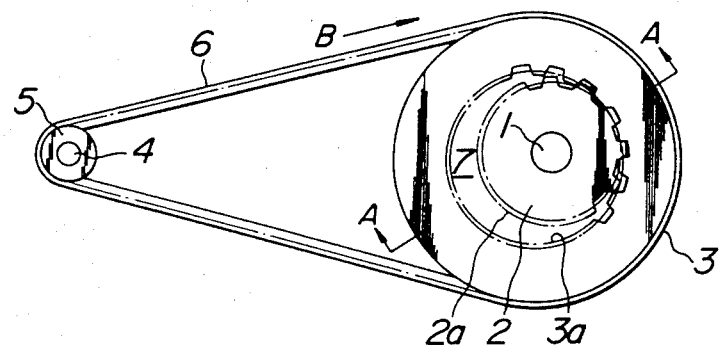
FIG. 1 is a front view of one example of a power transmission mechanism to which the present invention may be applied.

Referring firstly to FIG. 1, there is shown a power transmission mechanism to which the present invention may suitably be applied. The mechanism is used, for example, in a bicycle and includes a driving axle 1, a gear member 2 fixedly secured to the driving axle 1 and formed on its outer periphery with external gear teeth 2a, and an annular and eccentric floating member 3 formed with internal gear teeth 3a meshed with the external gear teeth 2a of the gear member 2. Spaced from the driving axle 1 rearwardly, i.e. on the left side of FIG. 1, there is provided a driven axle 4 to which is fixedly secured a driven wheel member 5. An endless and flexible cog-belt 6 made of reinforced elastomeric material engages outer peripheral teeth of the floating member 3 and outer peripheral teeth of the driven wheel member 5.

As the upper tight side of the cog-belt 6 is applied with a tension, as shown by an arrow B in FIG. 1, which is greater than that on the slack side of the cog-belt 6, the floating member 3 tends to bodily displace downwardly about the driving axle in an eccentric manner, thereby tightening the slack side of the cog-belt 6 and automatically compensating for the differential tension of the cog-belt 6.

As there is a crescent-shaped space 7 between the external gear teeth 2a of the gear member 2 and the internal gear teeth 3a of the floating member 3, when dust, mud, water, pebbles or other foreign material enters into the space 7, the gear teeth 2a, 3a are subjected to premature wear or serious damages deteriorating the durability of the mechanism. Still another problem resides in that, under vibratory operating conditions, the floating member 3 tends to disengage from the gear member 2 laterally, i.e. in the axial direction of the driving axle 1.

Figure 2:
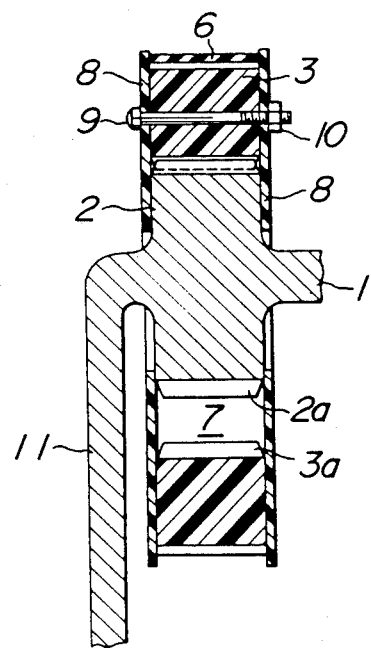
FIG. 2 is a sectional view taken substantially along the line A—A in FIG. 1, showing one example of an arrangement which includes a pair of guide plates secured on both outer sides of the floating member, but which is not in accordance with the present invention.

Those problems can be solved to certain extent by providing a pair of annular guide plates 8 on both outer sides of the gear member 2 and the floating member 3, as shown in FIG. 2. The guide plates 8 may be detachably secured, by means of bolts 9 and nuts 10, to either the floating member 3 or the gear member 2 such that the plates 8 are brought into sliding contact with either the gear member 2 or for the floating member 3 to substantially close the space 7. However, in this case, even a slight deformation or deflection of the guide plates 8 generates narrow gaps between the guide plates 8 and the floating member 3 and/or between the guide plate 8 and the gear member 2, through which dust or water is permitted to enter into the closed space 7. Moreover, the deformation or deflection of the guide plates 8 increases the sliding resistance between the guide plates 8 and the gear member 2 or the floating member 3.

The present invention provides a complete solution to the above-mentioned problems, of which some preferred embodiments will now be described in detail hereinafter. Throughout the figures, the same reference numerals denote the same or corresponding components.

Figure 3:
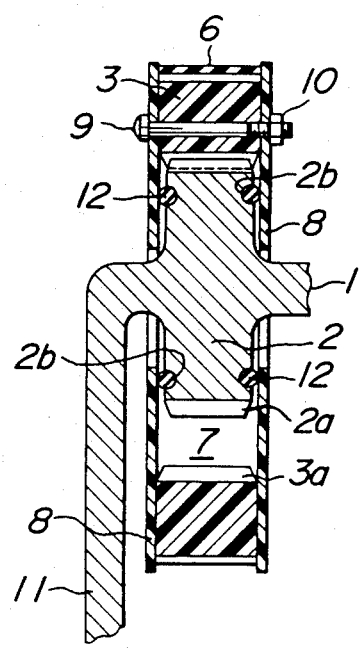
FIG. 3 is a sectional view similar to FIG. 2, but showing one embodiment of the present invention which now includes a pair of seal rings arranged between the opposite inner sides of the guide plates and both outer sides of the gear member.

According to a first embodiment of the present invention as shown in FIG. 3, the thickness or width of the gear member 2 as measured in the axial direction of the driving axle 1 is made slightly smaller than that of the floating member 3, with the guide plates 8 being detachably secured to both outer sides of the floating member 3. Each guide plate 8 has its outer diameter slightly greater than the pitch circle diameter of a gear formed by the cog-belt teeth on the outer periphery of the floating member 3, or than the outer diameter of that portion of the cog-belt 6 which is in engagement with the outer peripheral teeth of the floating member 3, and its inner diameter preferably made as small as possible to such an extent that the inner periphery of the guide plate is kept spaced from the driving axle 1 whatever angular position the floating member 3 connected to the guide plates 8 assumes with respect to the gear member 2 connected to the driving axle 1. On both outer sides of the gear member 2, there are formed a pair of annular grooves 2b having its diameter slightly smaller than the root circle diameter of the gear teeth 2a but greater than the inner diameter of the guide plates 8. Seal rings 12 made of resilient material such as rubber, polytetrafluoroethylene (PTFE) or other suitable synthetic resin material having a low frictional coefficient, are fitted into and carried by the grooves 2b, respectively, such that they protrude beyond the outer surfaces of the gear member 2 and slidingly engage with the opposite inner surfaces of the guide plates 8.

With the above-mentioned arrangement, the seal rings 12 on both sides of the gear member 2 effectively prevent entry into the crescent-shaped closed space 7 between the gear member 2 and the floating member 3, of the dust or other foreign material, without the necessity of maintaining the guide plates in direct contact with the gear member 2. As the space 7 is positively sealed from outside, the teeth 2a, 3a may be coated with grease or the like lubricant which can be kept for a long period without any substantial deterioration in its lubricating performances. Since only the resiliently deformable seal rings 12 are in sliding contact with the inner sides of the guide plates, a precise machining of those sides as would otherwise be required is unnecessary so that the guide plates 8 can be manufactured less costly.

Figure 4:
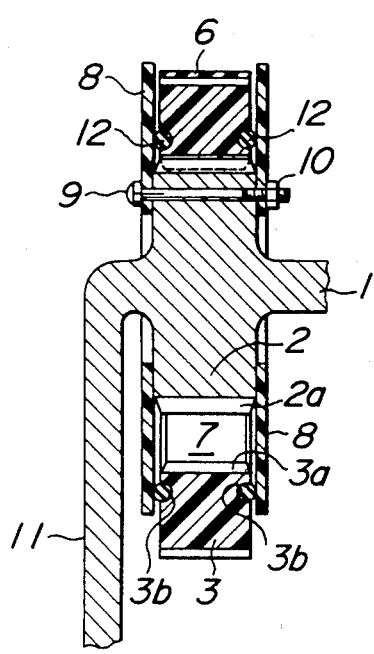
FIG. 4 is a sectional view showing another embodiment of the present invention in which the guide plates are secured to both outer sides of the gear member with the seal rings carried by the outer sides of the floating member.

FIG. 4 shows a second embodiment of the present invention, which differs from the first embodiment in that the guide plates 8 are secured to the gear member 2 while the seal rings 12 are retained in grooves 3b in the outer sides of the floating member 3. To this end, the thickness or width of the floating member 3 as measured in the axial direction of the driving axle 1 i is made slightly smaller than that of the gear member 2, and the outer diameter of the guide plates 8, which now achieve an eccentric motion with respect to the floating member 3, is determined such that, on the forward side in the driving direction of a line passing the axis of driving axle 1 and that position of the gear teeth 2a, 3a where they are completely meshed with each other, i.e. in the direction toward the upper right side in FIG. 1, the guide plates 8 slightly protrude radially outwards beyond the cog-belt 6. Otherwise, the construction and function of the present embodiment are essentially the same as those of the previous embodiment.

Because both the outer and inner peripheries of the floating member 3 subjected to a severe bending force are provided with the cog-belt teeth and gear teeth, respectively, it is not possible to further provide either of those peripheries with a reinforcing rib having an effective configuration. The rigidity of the floating member 3 can be increased by increasing the width and/or radial thickness of the floating member 3, but only together with a sacrifice of substantial increase in its weight. Such a problem can be eliminated by the third embodiment of the present invention shown in FIG. 5, which is substantially identical to the first embodiment with an exception that one of the guide plates 8, e.g. axially inner guide plate 8 is formed integrally with the floating member 3 as a radially inwardly directed flange. This integral guide plate 8 in the present embodiment serves to increase the rigidity of the floating member 3 or, while maintaining the overall rigidity constant, serves to reduce the weight of the floating member 3. Moreover, an effective reinforcement of the floating member 3 can be achieved without any additional component.

Figure 5:
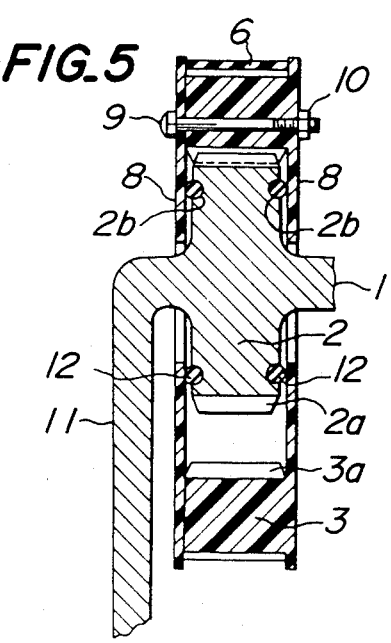
FIG. 5 is a sectional view showing still another embodiment of the present invention in which one of the guide plates is formed integrally with the floating member.
Figure 8C:
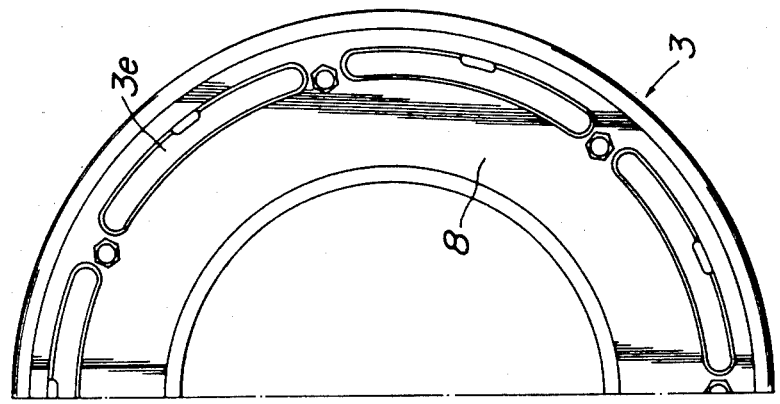
FIGS. 8A, 8B and 8C are front view, sectional view and rear view, respectively, of the floating member shown in FIG. 6.
Figure 8B:
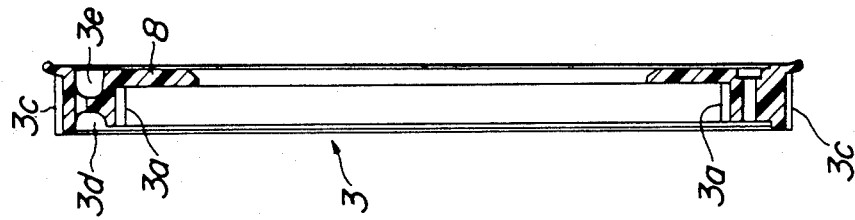
Figure 8A:
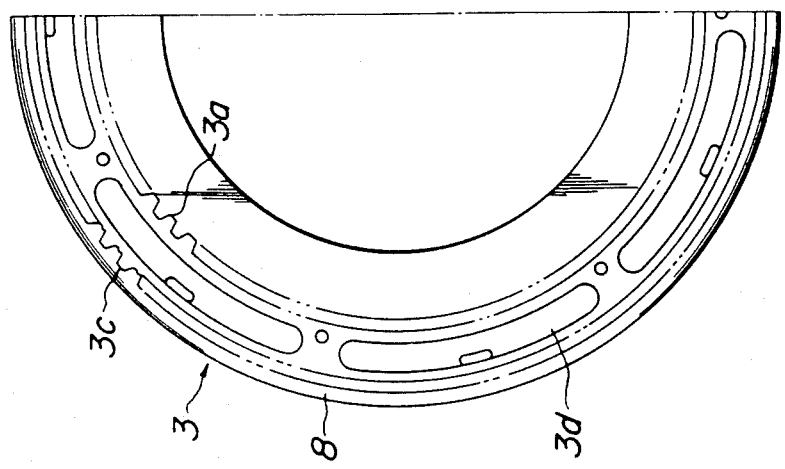

A practically applicable embodiment of the present invention is shown in FIGS. 6 and 7 as well as FIGS. 8A to 8C, which is essentially based on the arrangement shown in FIG. 5. In this embodiment, the crank arm 11 also shown in FIGS. 2 to 5 is of cotterless-type and is rigidly secured to the correspondingly shaped drive axle, not shown. Both the crank arm 11 and the gear member 2 consist of light metal alloy, such as aluminum alloy, and are fixedly secured to each other by means of calking or the like. The floating member 3 and guide plates 8 may each consist of light metal alloy also or, preferably, plastic material. Reference numeral 3c denotes the teeth for the cog-belt. Like in the previous embodiments, the guide plates 8 which extend radially outwards beyond the cog-belt teeth 3c achieve also the function of guiding the cog-belt 6 or preventing disengagement of the cog-belt 6 laterally from the floating member 3. As the guide plate 8 formed integrally with the floating member 3 contributes to increase the overall rigidity of the floating member 3, the floating member 3 is locally formed with recesses 3d, 3e to reduce the weight.

While the present invention has been described with reference to some preferred embodiments, the present invention may be carried out into practice in various manners without departing from its scope. For example, the power input/output relation of the mechanism may be reversed, by arranging the transmission wheel member on the drive side, and the gear member on the driven side, respectively. Furthermore, an endless chain may be used instead of cog-belt, in which case the floating member has to be provided with sprocket teeth on its outer periphery, to be combined with the transmission wheel member formed as a sprocket.

What is claimed is:

1. A power transmission mechanism comprising a gear member formed with external gear teeth and fixedly secured to a first axle, an annular floating member formed with internal gear teeth meshed with the external gear teeth of the gear member, a transmission wheel member spaced from the floating member and the gear member and fixedly secured to a second axle, an endless and flexible transmission member engaging the outer peripheries of the floating member and the transmission wheel member, a pair of annular guide plates connected to the outer sides of one of the group of the floating member and the gear member for rotation therewith and for preventing disengagement of the floating member laterally from the gear member, the guide plates each having an inner periphery whose diameter is determined such that at any angular position of the floating member with respect to the gear member the entire inner periphery extends inwards beyond the root circle of the gear member while being spaced from the first axle, and a pair of seal rings arranged between the opposite inner sides of the guide plates and both outer sides of the other of the floating member and the gear member for preventing entry of foreign material into a space formed between the gear member and the floating member.

2. The mechanism as claimed in claim 1, wherein the other of the floating member and the gear member is formed on the outer sides thereof with a pair of annular grooves within which said pair of seal rings are positioned respectively.

3. The mechanism as claimed in claim 1, wherein one of the guide plates is integrally connected with the floating member as a radially inwardly directed flange, while the other of the guide plates is detachably connected to the floating member.

4. The mechanism as claimed in claim 1, wherein the flexible transmission member consists of a cog-belt, the guide plates each having an outer periphery which at least partly extends outwards beyond the cog-belt for preventing disengagement of the cog-belt laterally from the floating member.

* * * * *